(12) United States Patent
Kim et al.

(10) Patent No.: US 8,537,920 B2
(45) Date of Patent: Sep. 17, 2013

(54) APPARATUS AND METHOD FOR TRANSMITTING DATA USING MULTI-ANTENNA

(75) Inventors: Yun-Joo Kim, Suwon-si (KR); Yoo-Seung Song, Daejon (KR); Jee-Yon Choi, Daejon (KR); Hyun-Gu Park, Seoul (KR); Minho Cheong, Daejon (KR); Sok-Kyu Lee, Daejon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 1263 days.

(21) Appl. No.: 12/174,929

(22) Filed: Jul. 17, 2008

(65) Prior Publication Data
US 2009/0135942 A1   May 28, 2009

(30) Foreign Application Priority Data
Nov. 28, 2007   (KR) .................. 10-2007-0122143

(51) Int. Cl.
*H04B 7/02* (2006.01)
*H04L 1/02* (2006.01)

(52) U.S. Cl.
USPC .......................................................... 375/267

(58) Field of Classification Search
USPC ................................................ 375/219, 267
See application file for complete search history.

(56) References Cited

U.S. PATENT DOCUMENTS

2004/0147289 A1 * 7/2004 Paljug et al. ............... 455/562.1
2008/0287069 A1 * 11/2008 Yoshimura ................... 455/69

FOREIGN PATENT DOCUMENTS

| KR | 2003022929 A | * | 3/2003 |
| KR | 1020030054666 A | | 7/2003 |
| KR | 1020040053861 A | | 6/2004 |
| KR | 10-2007-0022038 | | 2/2007 |
| KR | 10-2007-0087985 | | 8/2007 |
| KR | 10-2007-0100812 A | | 10/2007 |

OTHER PUBLICATIONS

Boris Ginzburg, Alex Kesslman, Perfomance Analysis of A-MPDU and A-MSDU Aggregation in IEEE 802.11n, Apr. 30-May 2, 2007, IEEE.*
Sangheetha Salai Parthasarathy et al., "A Novel Adaptive Scheme to Improve the Performance of the IEEE 802.11n WLANs", May 2007, pp. 334-339, vol. 2, 2007 IEEE 21st International Conference on Advanced Information Networking and Applications Workshops.

* cited by examiner

*Primary Examiner* — Chieh M Fan
*Assistant Examiner* — Tanmay Shah
(74) *Attorney, Agent, or Firm* — Kile Park Reed & Houtteman PLLC

(57) ABSTRACT

Provided are an apparatus and method for transmitting data using a multi-antenna. The apparatus includes a transmission buffer selecting unit for selecting transmission buffer of an antenna group corresponding to characteristics of each aggregated Medium access control Protocol Data Units (MPDU) when a list of aggregated MPDUs to transmit is received; a data transmitting unit for generating a list of aggregated MPDUs to transmit with storage information of the aggregated MPDUs, transferring the generated list to the transmission buffer selecting unit and transmitting corresponding aggregated MPDUs through the selected transmission buffer; and a timing controlling unit for controlling a transmission timing of each aggregated MPDU.

11 Claims, 4 Drawing Sheets

APPARATUS AND METHOD FOR TRANSMITTING DATA USING MULTI-ANTENNA

BACKGROUND OF THE INVENTION

1. Field of the Invention

The present invention relates to an apparatus and method for transmitting data using a multi-antenna; and, more particularly, to an apparatus and method for transmitting data using a multi-antenna, which decides an antenna group having a proper wireless channel for data characteristics and transmit data through the decided antenna group in order to support Quality of Service (QoS).

This work was supported by the IT R&D program of MIC/IITA [2006-S-002-02, "IMT-Advanced Radio Transmission Technology with Low Mobility"].

2. Description of Related Art

It is one of objects of a next generation wireless communication system to provide various data services as well as voice service. In order to provide the various data services, it is necessary to develop a high speed data communication technology that supports a data transmit rate of several Gigabits per second (Gbps) and Quality of Service (Qos).

A Multiple Input Multiple Output (MIMO) system uses a plurality of transmitting and receiving antennas for transmitting and receiving data. The MIMO system may incredibly increase channel capacity compared to a system using one transmitting antenna and one receiving antenna.

In order to realize such theoretical channel capacity gain of the MIMO system, various methods were introduced, such as Spatial Multiplexing and Space-Time codes.

The Spatial Multiplexing is a technology for simultaneously transmitting a plurality of data through different transmitting antennas. Therefore, the Spatial Multiplexing increases system capacity without system bandwidth increased additionally. Vertical-Bell Laboratory Layered Space-Time is one of the representative schemes thereof.

The Time-Space Code is a technology for obtaining diversity and coding gain at the same time by assigning proper codes to a data stream and transmitting data at a plurality of time slots through a plurality of antennas. Space-Time block code is one of representative schemes thereof.

For example, in a 2×2 MIMO system, a receiver receives a signal transmitted through one or more antennas from a transmitter by properly dividing the received signal. Therefore, the receiver can receive two data streams at one time slot. Also, a data error rate can be reduced by transmitting two data streams through two antennas.

That is, the MIMO system having multiple transmitting and receiving antennas can transmit at least one of data streams at the same time because of increment of transmission paths. Also, a receiving error is not generated from all of transmission paths or one predetermined wireless path.

As a method for controlling multiple transmitting antennas in the MIMO system, a physical layer applies the same data transmission scheme to multiple transmitting antennas, or applies different modulation schemes, i.e., MCS level, to each antenna in order to improve a data transmit rate of a system independently from a MAC layer. However, there is limitation to provide Quality of Service (QoS).

SUMMARY OF THE INVENTION

An embodiment of the present invention is directed to providing an apparatus and method for transmitting data using a multi-antenna for supporting a high speed data communication and guaranteeing a QoS of traffic at the same time.

In accordance with an aspect of the present invention, there is provided an apparatus for transmitting data using a multi-antenna, including: a transmission buffer selecting unit for selecting transmission buffer of an antenna group corresponding to characteristics of each aggregated Medium access control Protocol Data Units (MPDU) when a list of aggregated MPDUs to transmit is received; a data transmitting unit for generating a list of aggregated MPDUs to transmit with storage information of the aggregated MPDUs, transferring the generated list to the transmission buffer selecting unit and transmitting corresponding aggregated MPDUs through the selected transmission buffer; and a timing controlling unit for controlling a transmission timing of each aggregated MPDU.

In accordance with another aspect of the present invention, there is provided a method for transmitting data including: generating a list of aggregated MPDUs to transmit with storage information of the aggregated MPDUs when the aggregated MPDUs are stored in a transmission queue: selecting a transmission buffer of an antenna group corresponding to characteristics of each aggregated MPDU in the generated list; generating transmission timings of aggregated MPDUs; and transmitting corresponding aggregated MPDUs at the generated transmission timing through the selected transmission buffer.

In a multiple input multiple output (MIMO) system having an apparatus and method for transmitting data using a multi-antenna according to the present invention, a transmitting terminal has a MAC transmission structure for selecting a transmitting antenna group according to corresponding wireless channel characteristics among MCS levels and transmitting MPDUs through the selected antenna group in order to process data transmission according to a priority.

The apparatus and method for transmitting data according to the present invention can process large capacity data at a high speed such as several Gbps and support QoS of traffic, thereby improving overall performance of a communication system.

In a high speed wireless transmitting system, for example, a NOLA system, for transmitting and receiving data using a plurality of antennas each having unique channel characteristics, the apparatus and method for transmitting data according to the present invention decide transmission antennas or a transmission antenna group having a proper wireless channel for data characteristics and transmit data through the decided transmission antenna in order to improve performance of a wireless MAC protocol and system QoS.

Other objects and advantages of the present invention can be understood by the following description, and become apparent with reference to the embodiments of the present invention. Also, it is obvious to those skilled in the art to which the present invention pertains that the objects and advantages of the present invention can be realized by the means as claimed and combinations thereof.

DESCRIPTION OF SPECIFIC EMBODIMENTS

The advantages, features and aspects of the invention will become apparent from the following description of the embodiments with reference to the accompanying drawings, which is set forth hereinafter.

Figure 1:
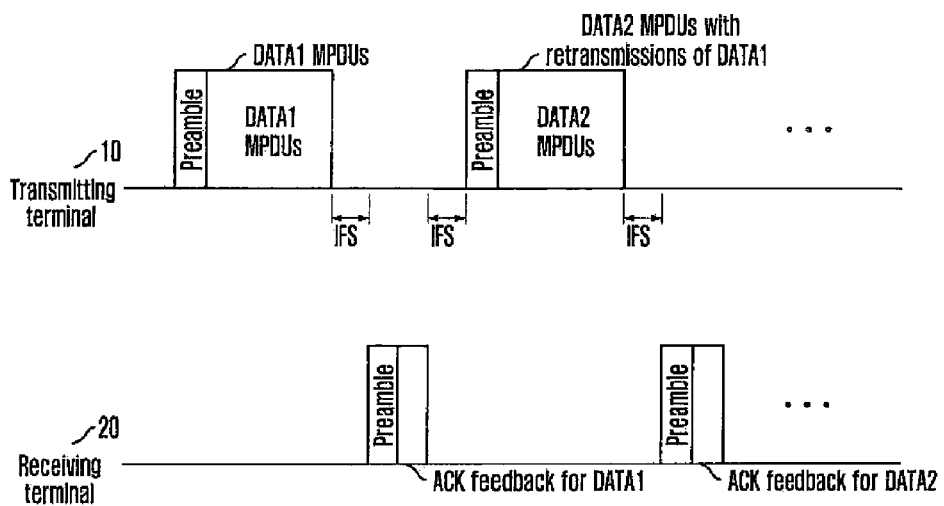
FIG. 1 is a diagram illustrating a procedure for transmitting and receiving a wireless protocol data and a respond frame in a multiple input multiple output (MIMO) antenna system.

FIG. 1 is a diagram illustrating a procedure for transmitting and receiving a wireless protocol data and a respond frame in a multiple input multiple output (MIMO) antenna system.

In the MIMO system, data are transmitted or received based on a time division multiple access (TDMA) scheme. In the TDMA scheme, a predetermined user access a wireless channel and transmits data through the wireless channel during a predetermined time slot that is given by dividing the same frequency by a small time unit.

That is, a transmitting terminal 10 transmits data through an allocated wireless channel, and a receiving terminal 20 receives the data from the transmitting terminal 10 in the TDMA scheme.

The receiving terminal 20 transmits an ACK frame for the received data if the receiving terminal 20 does not receive data from the transmitting terminal 10 during a predetermined time interval, such as inter frame space (IFS).

The transmitting terminal 10 receives the ACK frame and obtains data transmission information by analyzing the received ACK frame. Then, the transmitting terminal 10 retransmits corresponding data or transmits new data after the IFS according to the obtained data transmission information. Here, the transmission data stream includes a preamble and medium access control (MAC) data, which is required by a physical layer.

Figure 2:
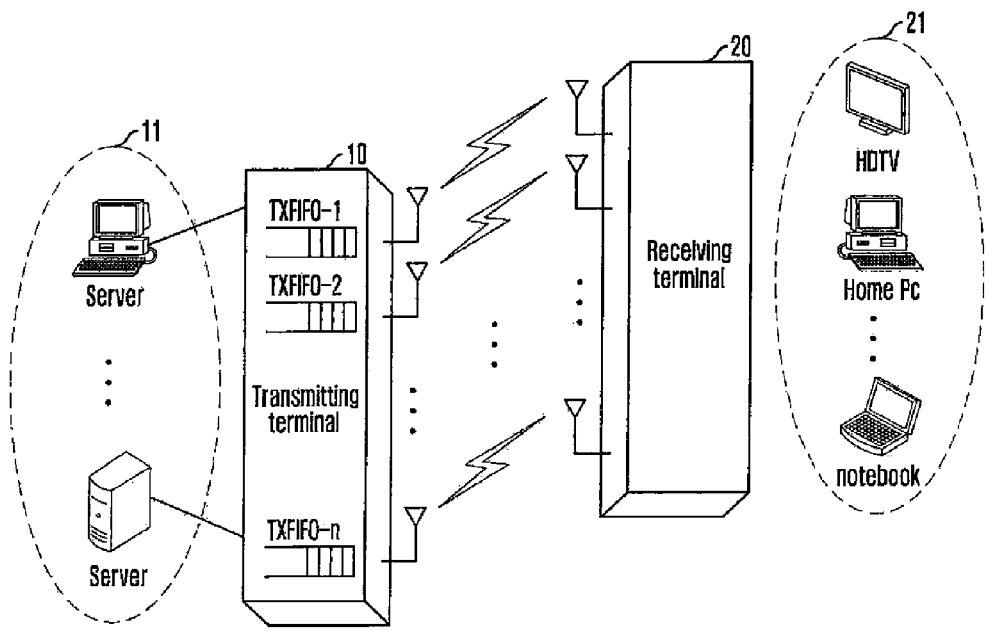
FIG. 2 is a diagram illustrating a system having multiple antennas for transmitting data at high speed where the present invention is applied.

FIG. 2 is a diagram illustrating a system having multiple antennas for transmitting data at high speed where the present invention is applied.

As shown in FIG. 2, the system includes an Internet 11 having a plurality of servers for providing services, a transmitting terminal 10 having a multi-antenna, a receiving terminal 20 having a multi-antenna, and a home network 21 for receiving services. The home network 21 may be the Internet. The transmitting terminal 10 transmit data to the receiving terminal 20 through wireless channels having different characteristics.

The transmitting terminal 10 includes a plurality of independent transmission buffers TX FIFO in order to apply data to corresponding antennas according to its unique characteristic.

The transmitting and receiving terminals 10 and 20 include multiple antennas and use different modulation and coding schemes for each of the multiple antennas according to characteristics of a wireless channel from a physical layer.

That is, a data transmit rate is decided based on a level of a modulation and coding scheme (MCS). A MCS level of each antenna is decided in consideration of QoS and wireless channel characteristics.

Priorities are decided in order of antennas having better performance according to the MCS level. After deciding the priorities, the priorities of antennas are grouped according to system environment.

Here, an antenna group is properly selected according to characteristics of data transmission in order to guarantee QoS because each antenna group has unique reordering threshold, bit error rate, and latency.

Figure 3:
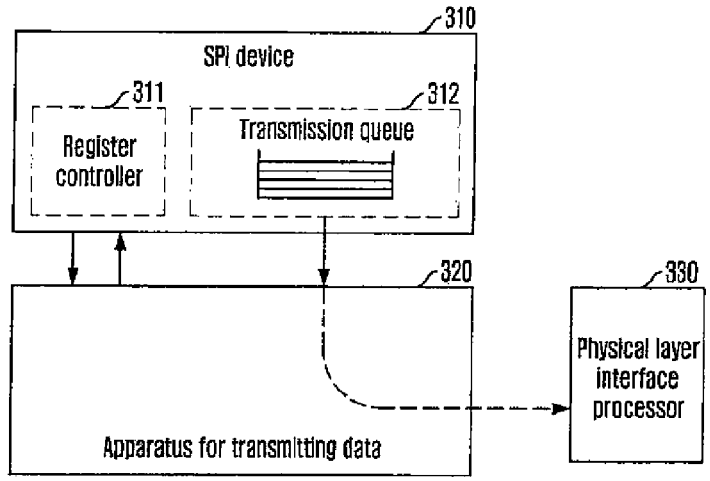
FIG. 3 is a diagram illustrating a medium access control (MAC) device for a transmitting system having multiple antennas where the present invention applied.

FIG. 3 is a diagram illustrating a medium access control (MAC) device for a transmitting system having multiple antennas where the present invention applied.

Referring to FIG. 3, the MAC device includes a system packet interface (SPI) 310, an apparatus 320 for transmitting data, and a physical layer interface processor 330. The SPI 310 reads data transferred from a CPU and stores the read data in a transmission queue 312 to access the data transmitter 320. Also, the SPI 310 controls the data transmitting apparatus 320 through a register controller 311 by connecting registers used in the data transmitting apparatus 320 to a host system.

The data transmitting apparatus 320 is a MAC hardware function unit that supports a data transmit rate of several Gbps. If the data transmitting apparatus 320 receives data while monitoring, the data transmitting apparatus 320 stores the received data in a transmission data memory, generates a transmit request signal, and stores the data in a transmission FIFO in order to enable an interface processor 330 of a physical layer to read data from the transmission FIFO.

Figure 4:
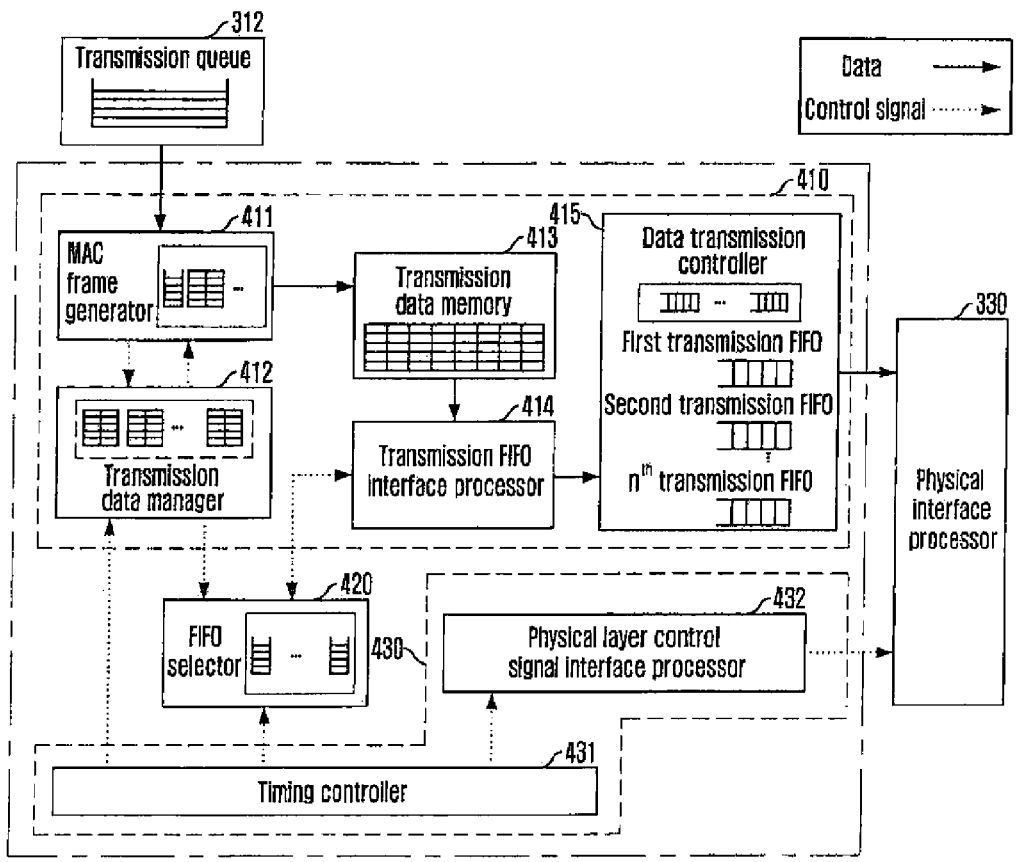
FIG. 4 is a diagram illustrating an apparatus for transmitting data using multiple antennas in accordance with an embodiment of the present invention.

FIG. 4 is a diagram illustrating an apparatus for transmitting data using multiple antennas in accordance with an embodiment of the present invention.

Referring to FIG. 4, the data transmitter apparatus according to the present embodiment includes a data transmitter 410, a transmission FIFO selector 420, and a timing controller 430. The data transmitter 410 generates a list of aggregated MAC Protocol Data Units (MPDU) to transmit with storage information on the aggregated MPDUs included, and transmit corresponding aggregated MPDUs through a selected transmission FIFO. The FIFO selector 420 receives the generated list of the aggregated MPDUs from the data transmitter 410 and selects a transmission FIFO corresponding to an optimal antenna group based on a priority and a reordering threshold according to the characteristics of each aggregated MPDU. The timing controller 430 controls a time of transmitting each of aggregated MPDUs.

The FIFO selector 420 manages at least one of antenna groups each having a reordering threshold, a bit error rate, and latency.

The reordering threshold means the number of aggregated MPDUs that a receiving terminal 20 can receive from a transmitting terminal 10 and store at one time. That is, if the reordering threshold of the receiving terminal 20 is 3, the FIFO selector 420 selects an antenna group having a reordering threshold less than 3, thereby transmitting less than 3 aggregated MPDUs at one time.

For example, the priority according to characteristics of aggregated MPDUs may be "retransmitting packet>voice packet>video packet>file transfer protocol (FTP) packet.

Hereinafter, constituent elements of the data transmitter 410 will be described in detail.

At first, the MAC frame generator 411 monitors a transmission queue 312 of the system packet interface 310 and transmission data (frame) is stored in the transmission queue 312. Then, the stored transmission data is converted into aggregated MPDU and stored it in the transmission data memory 413.

The MAC frame generator 411 manages addresses and data descriptor (sequence number) for the transmission data memory 413 using a Dual-ported Random Access Memory (DPRAM) or a First In First Out (FIFO) type memory.

Also, the MAC frame generator 411 manages a list of aggregated MPDUs to transmit and the transmission data memory 413 with the transmission data manager 412, thereby enabling high speed data transmission.

As the aggregated MPDU is stored in the transmission data memory 413, the transmission data manager 412 receives descriptor information from the MAC frame generator 411. The transmission data manager 412 generates and manages the aggregated MPDU list formed of descriptor information.

The transmission data manager 412 also generates a list of aggregated MPDUs to retransmit based on feedback aggregated MPDU information from the receiving terminal 20.

The transmission FIFO interface processor 414 reads aggregated MPDUs from the transmission data memory 413 using descriptor information of each aggregated MPDU. Then, the transmission FIFO interface processor 414 stores the read aggregated MPDUs in a corresponding transmission FIFO according to the transmission FIFO interface. Here, the data transmission controller 415 internally includes the transmission FIFO. The transmission FIFO also has a structure that enables the physical layer interface processor 330 to easily access thereto.

The physical layer interface processor 330 starts reading aggregated MPDUs stored in the transmission FIFO directly corresponding to a data transmission time. The data transmission controller 415 controls aggregated MPDUs stored in the transmission FIFO in consideration of the length of each aggregated MPDU in order to seamlessly transmit the aggregated MPDU through corresponding antenna group. That is, the data transmission controller 415 arranges the aggregated MPDUs.

The physical layer interface processor 330 refers a control signal generated by the physical layer control signal interface processor 432 to start transmission. The control signal is for controlling power and operation of a physical layer for multiple transmitting and receiving antennas.

Throughout the specification, one time unit refers to a symbol. Downlink operations and uplink operations are performed by allocating a frequency to a transmitter or a receiver for a fixed number of symbols.

Therefore, a transmission control signal required in a physical layer is generated based on a fixed timing signal generated at the timing controller 431 and used for controlling power and operation of the transmitting antennas and receiving antennas.

The timing controller 431 generates timing information for realizing predefined symbol time units and generates a downlink, an uplink, and a timing signal of a frame formed of IFS.

The timing controller 431 processes control signals for transmitting and receiving fames in order to control overall operation of a system in reference with all of the generated timings.

Figure 5:
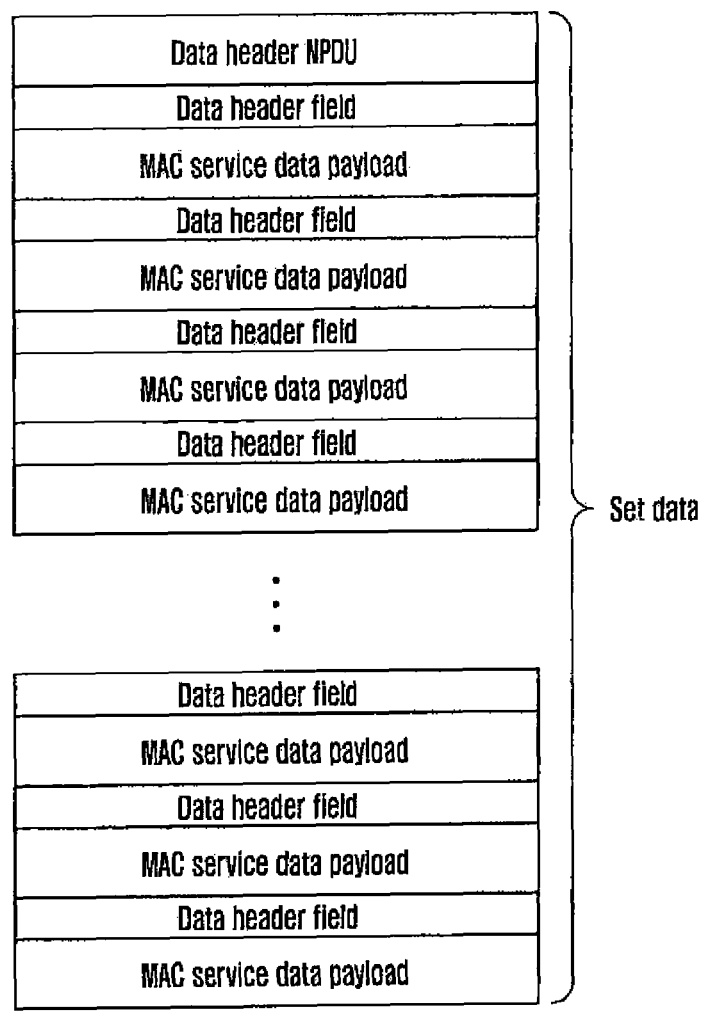
FIG. 5 is a diagram illustrating an aggregated MPDU in accordance with an embodiment of the present invention.

FIG. 5 is a diagram illustrating an aggregated MPDU in accordance with an embodiment of the present invention.

As shown in FIG. 5, the aggregated MAC protocol data unit (MPDU) is a basic unit that supports a MAC layer. A response frame thereof is a MPDU having an acknowledgement (ACK) bit map for the aggregated MPDU.

It is preferable to use a predetermined value defined according to a system environment as the maximum length of downlink data and the maximum length of the uplink data.

Figure 6:
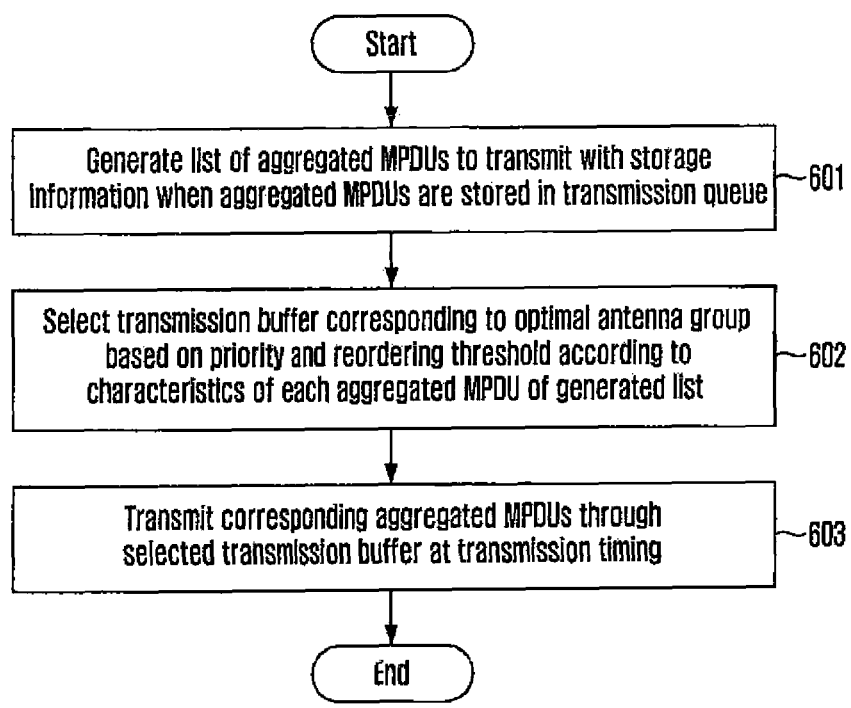
FIG. 6 is a flowchart illustrating a data transmitting method using multiple antennas in accordance with an embodiment of the present invention.

FIG. 6 is a flowchart illustrating a method for transmitting data using a multi-antenna in accordance with an embodiment of the present invention. Since the operations of the apparatus for transmitting data using multi-antenna according to the present embodiment was already described above, the method according to the present embodiment will be described in brief.

At step S601, a list of aggregated MPDUs to transmit is generated with storage information thereof as the aggregated MPDU is stored in a transmission queue.

At step S602, a transmission buffer is selected according to the optimal antenna group based on a priority and a reordering threshold which is assigned according to characteristics of each aggregated MPDU of the generated list.

Then, the corresponding aggregated MPDU is transmitted through the selected transmission buffer based on transmission timing at step S603.

As described above, the apparatus and method for transmitting data using a multi-antenna according to the present invention can support QoS while transmitting large data at high speed through multiple transmitting and receiving antennas by deciding an antenna group having a proper wireless channel for data characteristics and transmitting data through the selected transmission antenna.

The above described method according to the present invention can be embodied as a program and stored on a computer readable recording medium. The computer readable recording medium is any data storage device that can store data which can be thereafter read by the computer system. The computer readable recording medium includes a read-only memory (ROM), a random-access memory (RAM), a CD-ROM, a floppy disk, a hard disk and an optical magnetic disk.

The present application contains subject matter related to Korean Patent Application No. 2007-01222143, filed in the Korean Intellectual Property Office on Nov. 28, 2007, the entire contents of which is incorporated herein by reference.

While the present invention has been described with respect to the specific embodiments, it will be apparent to those skilled in the art that various changes and modifications may be made without departing from the spirit and scope of the invention as defined in the following claims.

What is claimed is:

1. An apparatus for transmitting data using a multi-antenna, comprising:
 a transmission buffer selecting means for receiving a list of aggregated medium access control Protocol Data Units (MPDUs) to transmit and selecting a transmission buffer of an antenna group based on the list of the aggregated MPDUs;
 a data transmitting means for:
  generating the aggregated MPDUs by transforming transmission data from a transmission queue into the aggregated MPDUs;
  storing the aggregated MPDUs in a transmission data memory;
  generating the list of the aggregated MPDUs including storage information of the aggregated MPDUs;
  transferring the generated list to the transmission buffer selecting means;
  reading the aggregated MPDUs from the transmission data memory and storing the aggregated MPDUs in the selected transmission buffer; and
  transmitting the aggregated MPDUs through the selected transmission buffer; and
 a timing controlling means for controlling a transmission timing of each aggregated MPDU,
 wherein the data transmitting means comprises:
  an aggregated MPDU generator configured to generate the aggregated MPDUs and store the aggregated MPDUs in the transmission data memory;

a transmission data manager configured to generate the list of the aggregated MPDUs to transmit with storage information when the aggregated MPDUs are stored in the transmission data memory, and to manage the generated list;

a transmission buffer interface processor configured to read the aggregated MPDUs from the transmission data memory using the storage information and to store the aggregated MPDUs in the selected transmission buffer; and a data transmission controller configured to control transmission of the aggregated MPDUs.

2. The apparatus of claim 1, wherein the transmission buffer selecting means manages at least one of antenna groups having a reordering threshold, a bit error rate, and latency.

3. The apparatus of claim 1, wherein the aggregated MPDU generator is configured to manage addresses and data descriptors of the transmission data memory.

4. The apparatus of claim 1, wherein the transmission data manager is configured to generate and manage a list of aggregated MPDUs to retransmit based on feedback information of aggregated MPDU.

5. The apparatus of claim 1, wherein the timing controlling means comprises:

a timing controller configured to generate a fixed timing signal; and a physical layer control signal interface processor configured to generate power and an operation control signal according to the generated timing signal.

6. A method for transmitting data comprising:

generating aggregated MPDUs by transforming transmission data from a transmission queue into the aggregated MPDUs;

storing the aggregated MPDUs in a transmission data memory;

generating a list of the aggregated MPDUs including storage information of the aggregated MPDUs;

selecting a transmission buffer of an antenna group based on the list of the aggregated MPDUs;

reading the aggregated MPDUs from the transmission data memory and storing the aggregated MPDUs in the selected transmission buffer;

generating transmission timings of the aggregated MPDUs; and transmitting the aggregated MPDUs at the generated transmission timing through the selected transmission buffer, wherein the generating the aggregated MPDUs comprises managing addresses and data descriptors for the transmission data memory.

7. The method of claim 6, wherein the selecting the transmission buffer comprises managing at least one of antenna groups having a reordering threshold, a bit error rate, and latency.

8. The method of claim 6, wherein the generating the list of the aggregated MPDUs comprises generating and managing a list of aggregated MPDUs to retransmit based on feedback information of aggregated MPDUs.

9. The method of claim 6, wherein the generating the transmission timings comprises:

generating a fixed timing signal; and generating control signals for power and operations of an antenna according to the generated timing signal.

10. The apparatus of claim 1, wherein the transmission buffer selecting means selects the transmission buffer based on a priority and a reordering threshold, which correspond to characteristics of the aggregated MPDUs, and wherein the priority and the reordering threshold are determined based on receiving conditions of a receiving terminal.

11. The method of claim 6, wherein the selecting the transmission buffer is based on a priority and a reordering threshold, which correspond to characteristics of the aggregated MPDUs, and wherein the priority and the reordering threshold are determined based on receiving conditions of a receiving terminal.

* * * * *